US006690642B2

United States Patent
Chen

(10) Patent No.: US 6,690,642 B2
(45) Date of Patent: Feb. 10, 2004

(54) OPTICAL DISK

(75) Inventor: I-Ming Chen, Taipei (TW)

(73) Assignee: Computech International Ventures Limited, Tortola (VG)

( * ) Notice: Subject to any disclaimer, the term of this patent is extended or adjusted under 35 U.S.C. 154(b) by 376 days.

(21) Appl. No.: 09/752,458

(22) Filed: Jan. 3, 2001

(65) Prior Publication Data

US 2002/0009047 A1 Jan. 24, 2002

Related U.S. Application Data

(63) Continuation-in-part of application No. 09/624,915, filed on Jul. 24, 2000, now Pat. No. 6,473,391.

(30) Foreign Application Priority Data

Nov. 17, 2000 (TW) .................................. 89208295A01 U

(51) Int. Cl.$^7$ ................................................ G11B 3/70
(52) U.S. Cl. ...................................................... 369/290
(58) Field of Search ................................ 369/290, 282, 369/291, 275.5, 273, 280, 272; 360/135; 428/64.1, 64.6, 65.2, 65.5

(56) References Cited

U.S. PATENT DOCUMENTS

| | | | | |
|---|---|---|---|---|
| 4,879,710 A | * | 11/1989 | Iijima | 369/291 |
| 5,323,381 A | * | 6/1994 | Takahashi et al. | 369/282 |
| 5,541,910 A | * | 7/1996 | Tanaka et al. | 369/290 |
| 5,729,533 A | * | 3/1998 | Marquardt | 369/273 |
| 5,859,834 A | * | 1/1999 | Takahashi et al. | 369/290 |
| 5,982,736 A | * | 11/1999 | Pierson | 369/273 |
| 6,473,391 B1 | * | 10/2002 | Chen | 369/290 |
| 6,495,232 B2 | * | 12/2002 | Weber | 428/64.1 |

* cited by examiner

*Primary Examiner*—Tianjie Chen
(74) *Attorney, Agent, or Firm*—Finnegan, Henderson, Farabow, Garrett & Dunner, L.L.P.

(57) ABSTRACT

An optical disk includes a disk body and a cap body. The disk body has a first surface adapted to be printed thereon, and a second surface opposite to the first surface and adapted to store optical data. The first surface is formed with a central cap-receiving recess that extends downwardly and that has an inner annular surface and a recess bottom. The second surface is formed with a shaft-receiving recess that extends upwardly and that is communicated with the cap-receiving recess. The cap-receiving recess has an area larger than that of the shaft-receiving recess. The cap body is received in the cap-receiving recess, and has a top side adapted to be printed thereon, and a peripheral portion on the recess bottom. The cap body is movable from a normal position, where the top side of the cap body is flush with the first surface of the disk body, to a position of use, where the cap body protrudes relative to the first surface of the disk body.

6 Claims, 2 Drawing Sheets

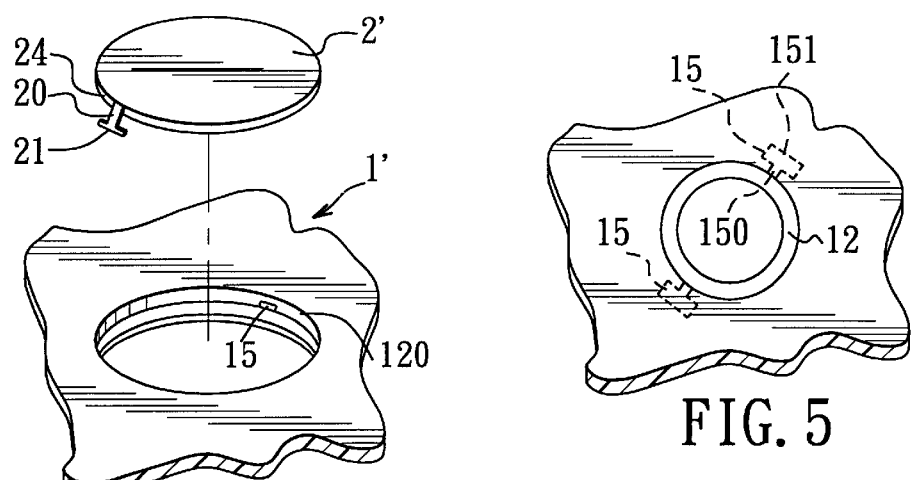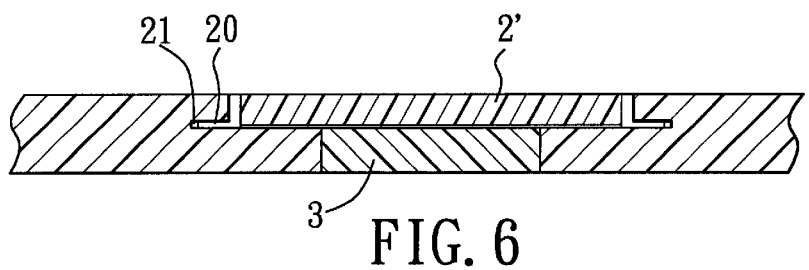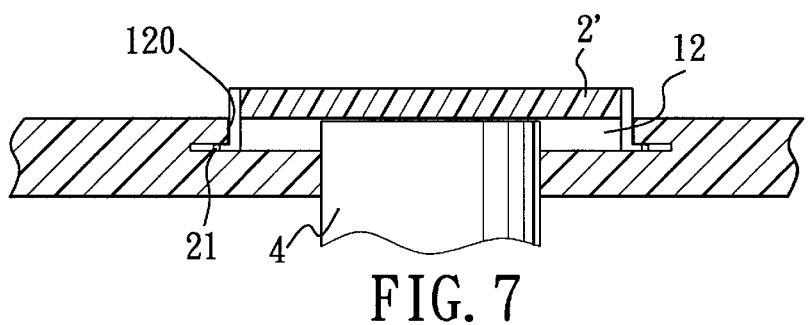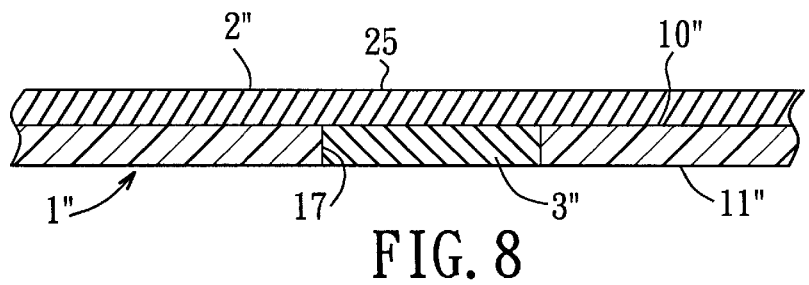

OPTICAL DISK

CROSS-REFERENCE TO RELATED APPLICATION

This application is a continuation-in-part application of U.S. application Ser. No. 09/624,915 which was filed on Jul. 24, 2000, now U.S. Pat. No. 6,473,391B1.

BACKGROUND OF THE INVENTION

1. Field of the Invention

The invention relates to an optical disk, more particularly to an optical disk that includes a disk body and a cap body, which are adapted to be printed thereon.

2. Description of the Related Art

A conventional optical disk, which may be circular or rectangular, has a surface adapted to be printed thereon. The conventional optical disk further has a central through hole for extension of a rotary driving shaft of an optical disk reader. Due to the presence of the through hole, the area of the conventional optical disk that can be printed is reduced, and the picture that is printed on the surface of the optical disk is not complete.

SUMMARY OF THE INVENTION

Therefore, the object of the present invention is to provide an optical disk that includes a disk body and a cap body, which are adapted to be printed thereon to result in a larger printable area.

According to the present invention, the disk body of an optical disk has a first surface adapted to be printed thereon, and a second surface opposite to the first surface and adapted to store optical data. The first surface is formed with a central cap-receiving recess that extends downwardly and that has an inner annular surface and a recess bottom. The second surface is formed with a shaft-receiving recess that extends upwardly and that is communicated with the cap-receiving recess. The cap-receiving recess has an area larger than that of the shaft-receiving recess.

The cap body of the optical disk is received in the cap-receiving recess, and has a top side adapted to be printed thereon, and a peripheral portion on the recess bottom. The cap body is movable from a normal position, where the top side of the cap body is flush with the first surface of the disk body, to a position of use, where the cap body protrudes relative to the first surface of the disk body.

BRIEF DESCRIPTION OF THE DRAWINGS

Other features and advantages of the present invention will become apparent in the following detailed description of the preferred embodiments with reference to the accompanying drawings, of which:

FIG. 4 is a fragmentary exploded perspective view showing the second preferred embodiment of an optical disk according to this invention;

FIG. 5 is a fragmentary schematic top view of a disk body of the second preferred embodiment;

FIG. 6 is a fragmentary sectional schematic view showing the second preferred embodiment in a state of non-use;

FIG. 7 is a fragmentary sectional schematic view showing the second preferred embodiment in a state of use; and FIG. 8 is a fragmentary sectional schematic view showing the third preferred embodiment of an optical disk according to this invention.

DETAILED DESCRIPTION OF THE PREFERRED EMBODIMENTS

Figure 1:
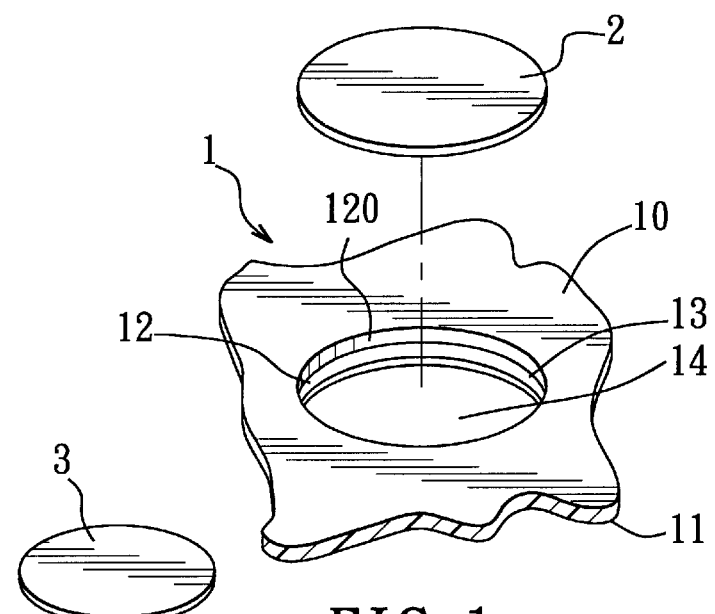
FIG. 1 is a fragmentary exploded perspective view showing the first preferred embodiment of an optical disk according to this invention.

Before the present invention is described in greater detail, it should be noted that like elements are denoted by the same reference numerals throughout the disclosure.

Figure 2:
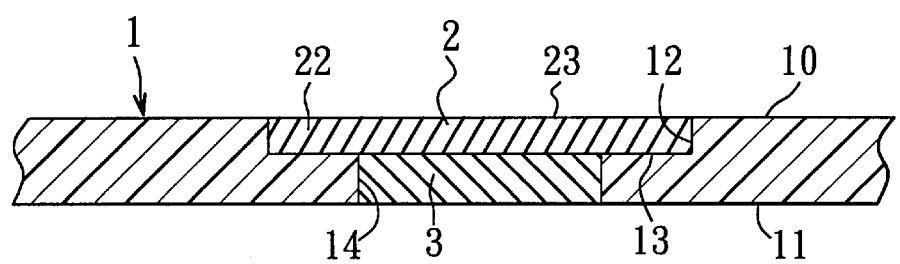
FIG. 2 is a fragmentary sectional schematic view showing the first preferred embodiment in a state of non-use.

Referring to FIGS. 1 and 2, according to the first preferred embodiment of this invention, an optical disk is shown to include a disk body 1, a cap body 2, and an auxiliary cap body 3.

The disk body 1, which can be circular or rectangular, has a first surface 10 adapted to be printed thereon, and a second surface 11 opposite to the first surface 10 and adapted to be store optical data in a known manner. The first surface is formed with a central cap-receiving recess 12 that extends downwardly and that has an inner annular surface 120 and a recess bottom 13. The second surface 11 is formed with a shaft-receiving recess 14 that extends upwardly and that is communicated with the cap-receiving recess 12. The cap-receiving recess 12 has an area larger that that of the shaft-receiving recess 14.

In this embodiment, the cap body 2 is made from a flexible material, and is received in the cap-receiving recess 12. The cap body 2 has a top side 23 adapted to be printed thereon, and a peripheral portion 22 on the recess bottom 13. The peripheral portion 22 of the cap body 2 is mounted adhesively on the recess bottom 13.

The auxiliary cap body 3 is fitted removably in the shaft-receiving recess 14.

Figure 3:
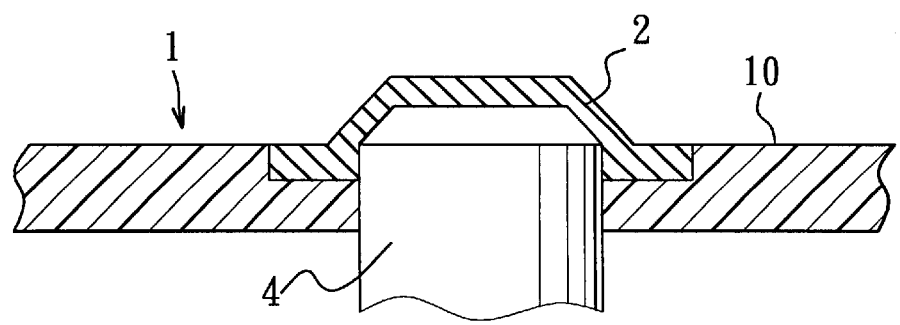
FIG. 3 is a fragmentary sectional schematic view showing the first preferred embodiment in a state of use.

Referring to FIG. 3, during use, the auxiliary cap body 3 is removed from the shaft-receiving recess 14, and a rotary driving shaft 4 of an optical disk reader (not shown) extends through the shaft-receiving recess 14 and into the cap-receiving recess 12. As such, the rotary driving shaft 4 pushes upwardly the cap body 2 from a normal position, where the top side 23 of the cap body 2 is flush with the first surface 10 of the disk body 1, as shown in FIG. 2, to a position of use, where the cap body 2 protrudes relative to the first surface 10 of the disk body 1, as shown in FIG. 3.

It is noted that due to the presence of the cap body 2, the optical disk of this invention thus has an additional printable area such that the picture and words, which are printed on the first surface 10 of the disk body 1, can be uninterrupted.

FIGS. 4 to 6 illustrate the second preferred embodiment of the present invention, which is a modification of the first preferred embodiment. Unlike the previous embodiment, the inner annular surface 120 is formed with opposite radial lug-receiving slots 15 (see FIG. 4). As shown in FIG. 5, each of the lug-receiving slots 15 has a radial inner portion 150, and a radial outer portion 151 wider than the radial inner portion 150 and distal to the cap-receiving recess 12 relative to the radial inner portion 150. The cap body 2' further has opposite flexible lug units extending from a periphery 24 thereof. As shown in FIGS. 4 and 6, each of the lug units has an engaging portion 21 that is received movably in the radial outer portion 151 of a respective one of the lug-receiving slots 15, and a slide portion 20 that interconnects the engaging portion 21 and the periphery 24 of the cap body 2'.

The engaging portion 21 of each of the lug units is wider than the radial inner portion 150 of the respective one of the lug-receiving slots 15.

Due to the weight of the cap body 2', the slide portion 20 of each of the lug units normally extends into the radial outer portion 151 of the respective one of the lug-receiving slots 15 such that the engaging portion 21 is moved radially outward away from the cap-receiving recess 12 when the cap body 2' is in the normal position (see FIG. 6).

The slide portion 20 of each of the lug units partly extends out of the radial inner portion 150 of the respective one of the lug-receiving slots 15 so as to extend adjacent to the inner annular surface 120 of the cap-receiving recess 12 and thereby pull the engaging portion 21 radially inward toward the cap-receiving recess 12 when the rotary driving shaft 4 of an optical disk reader (not shown) extends into the cap-receiving recess 12 to push upwardly the cap body 2' to the position of use (see FIG. 7).

Referring to FIG. 8, according to the third preferred embodiment of this invention, an optical disk is shown to include a disk body 1", a flexible cover layer 2", and an auxiliary cap body 3".

The disk body 1" has a first surface 10", a second surface 11" opposite to the first surface 10" and adapted to store optical data in a known manner, and a central through-hole 17 extending from the first surface 10" through the second surface 11".

The cover layer 2" covers the through-hole 17 at the first surface 10" of the disk body 1", and has a top side 25 adapted to be printed thereon. Preferably, the cover layer 2" is mounted adhesively on the first surface 10" of the disk body 1".

The auxiliary cap body 3" is fitted removably in the through-hole 17 from the second surface 11" of the disk body 1".

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. An optical disk comprising:
    a disk body having a first surface adapted to be printed thereon, and a second surface opposite to said first surface and adapted to store optical data, said first surface being formed with a central cap-receiving recess that extends downwardly and that has an inner annular surface and a recess bottom, said second surface being formed with a shaft-receiving recess that extends upwardly and that is communicated with said cap-receiving recess, said cap-receiving recess having an area larger than that of said shaft-receiving recess; and a cap body received in said cap-receiving recess, said cap body having a top side adapted to be printed thereon, and a peripheral portion on said recess bottom, said cap body being movable from a normal position, where said top side of said cap body is flush with said first surface of said disk body, to a position of use, where said cap body protrudes relative to said first surface of said disk body.

2. The optical disk of claim 1, wherein said cap body is made from a flexible material.

3. The optical disk of claim 2, wherein said peripheral portion of said cap body is mounted adhesively on said recess bottom.

4. The optical disk of claim 1, further comprising an auxiliary cap body fitted removably in said shaft-receiving recess.

5. The optical disk of claim 1, wherein said inner annular surface is formed with opposite radial lug-receiving slots, each of said lug-receiving slots having a radial inner portion, and a radial outer portion wider than said radial inner portion and distal to said cap-receiving recess relative to said radial inner portion.

6. The optical disk of claim 5, wherein said cap body further has opposite flexible lug units extending from a periphery thereof, each of said lug units having an engaging portion that is received movably in said radial outer portion of a respective one of said lug-receiving slots, and a slide portion that interconnects said engaging portion and said periphery of said cap body, said engaging portion of each of said lug units being wider than said radial inner portion of the respective one of said lug-receiving slots, said slide portion of each of said lug units extending into said radial outer portion of the respective one of said lug-receiving slots such that said engaging portion is moved radially outward away from said cap-receiving recess when said cap body is in the normal position, said slide portion of each of said lug units partly extending out of said radial inner portion of the respective one of said lug-receiving slots so as to extend adjacent to said inner annular surface of said cap-receiving recess and thereby pull said engaging portion radially inward toward said cap-receiving recess when said cap body is in the position of use.

* * * * *